United States Patent [19]

Molenaar

[11] 4,074,958
[45] Feb. 21, 1978

[54] APPARATUS FOR MAKING A COIL SPRING OBJECT

[76] Inventor: Lester V. Molenaar, Box 777, West Highway 40, Willmar, Minn. 56201

[21] Appl. No.: 730,801

[22] Filed: Oct. 8, 1976

[51] Int. Cl.² .............................................. B29C 17/00
[52] U.S. Cl. .............................. 425/71; 264/DIG. 40; 425/131.1; 425/296; 425/319; 425/391; 425/462; 425/DIG. 57
[58] Field of Search ................. 72/137, 142, 146, 256, 72/467, 468; 140/103; 425/133.5, 319, 325, 391, 334, 131.1, DIG. 57, 462, 71, 296, 308, 315; 264/171, 174, 245, 281, 339, DIG. 40; 46/1 R

[56] References Cited

U.S. PATENT DOCUMENTS 2,450,324   9/1948   Wilson et al. .................... 425/391 X
3,761,211   9/1973   Parkinson .......................... 425/133.5

Primary Examiner—Francis S. Husar
Assistant Examiner—Mark Rosenbaum
Attorney, Agent, or Firm—Burd, Braddock & Bartz

[57] ABSTRACT

A machine having two extruders operable to move hot plastic materials of different colors through passages of a die. The die has a merging chamber where the plastic materials from the two extruders are fused in side-by-side positions and an outlet opening through which the fused materials are discharged to form a two-colored ribbon product. A rotatable mandrel located in a water tank winds the ribbon product into a helical coil spring shape. A separator plate surrounding the mandrel guides the ribbon in a helical direction as the ribbon is wound around the mandrel. The ribbon product is cooled and set as it is wound around the mandrel.

27 Claims, 12 Drawing Figures

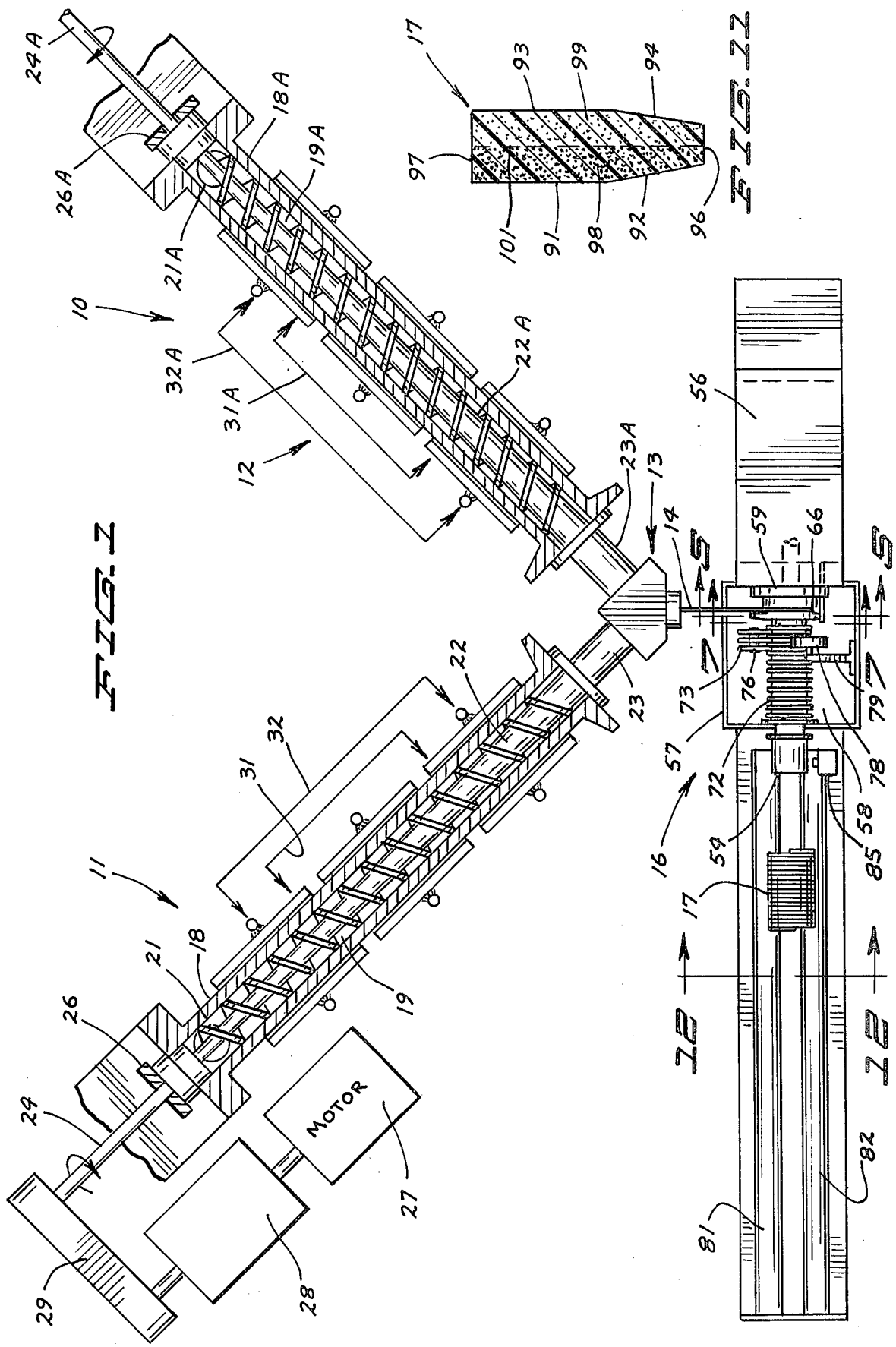

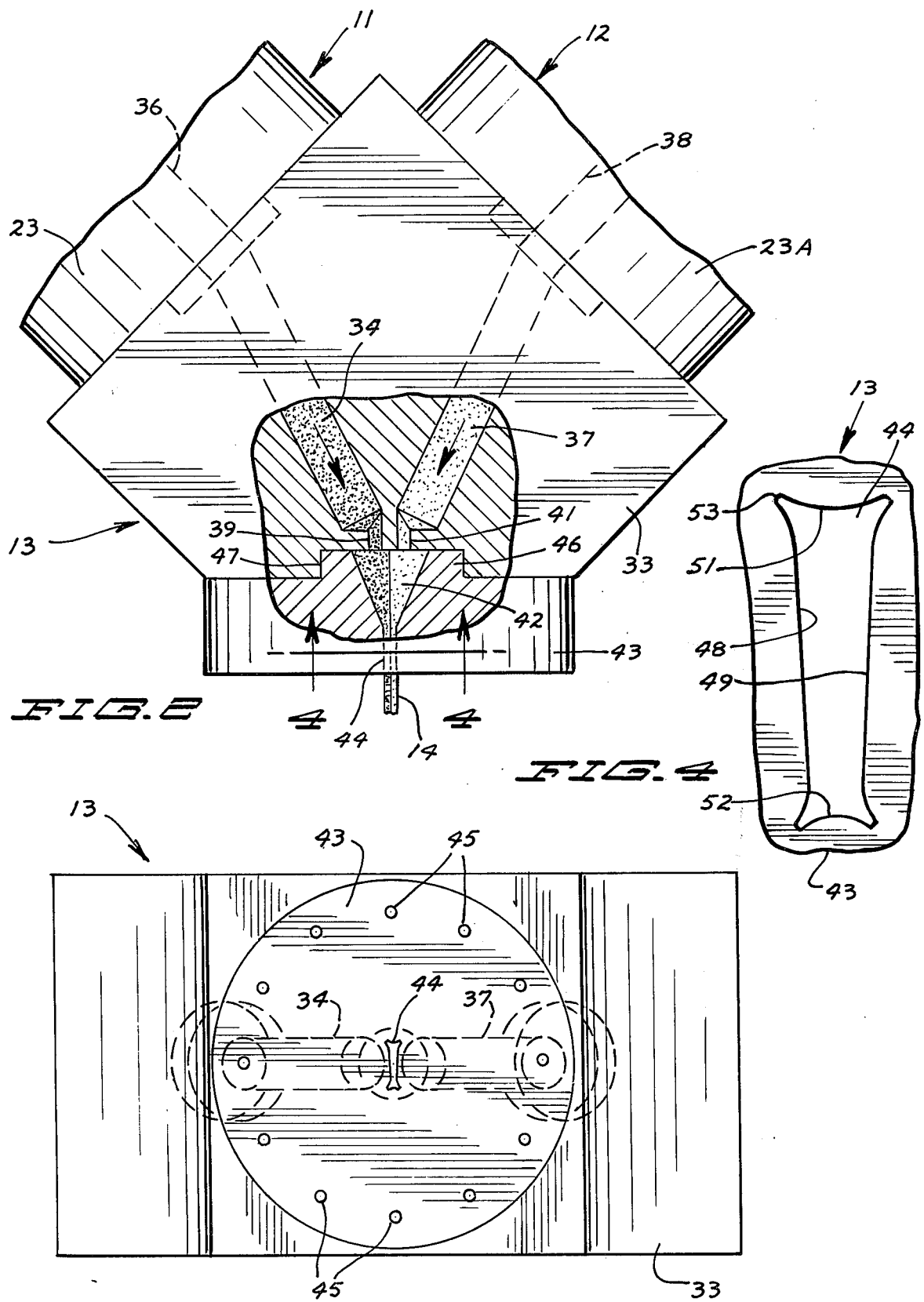

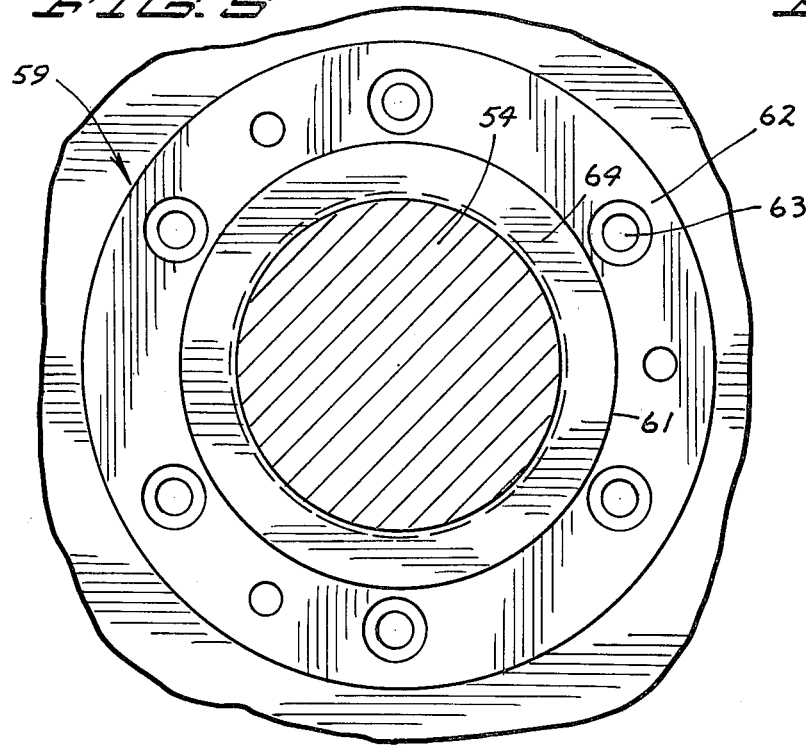
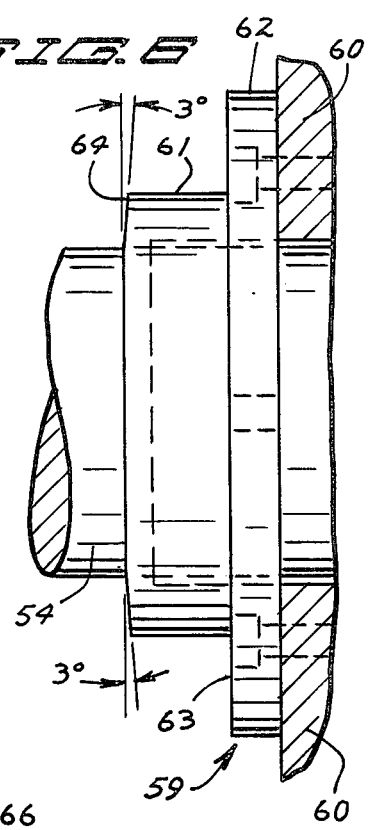
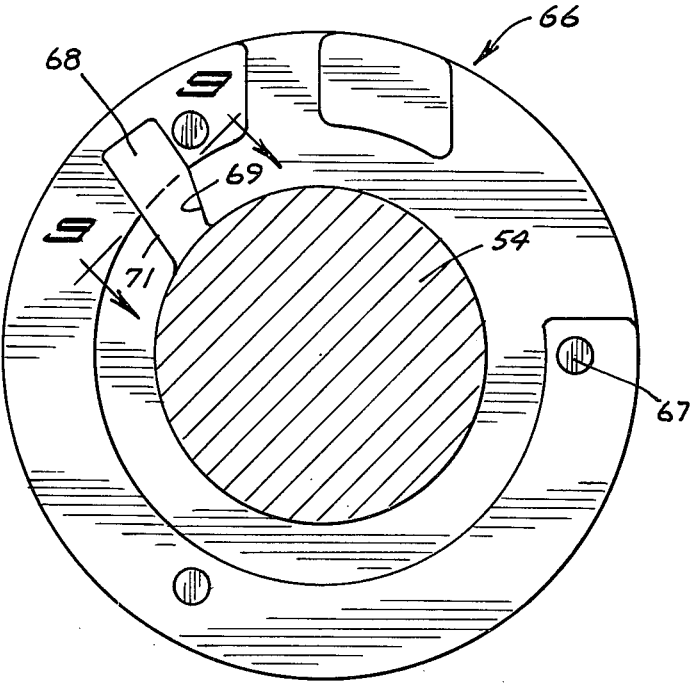
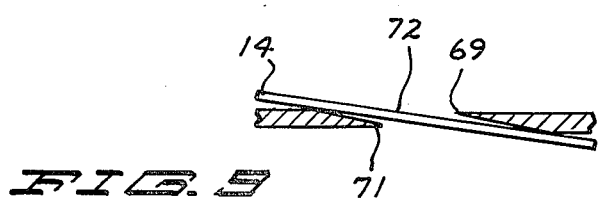

APPARATUS FOR MAKING A COIL SPRING OBJECT

BACKGROUND OF THE INVENTION

Coiled spring toys having a plurality of metal turns have been marketed under the trademark SLINKEY. These toys are made from an elongated strip of metal having a generally rectangular cross section. The metal is a spring steel having a dull gray appearance. The metal has a relatively low deformation strength as the turns or segments bend and twist out of shape. The expanded spring toy has a tendency to change position so that the turns become tangled and hooked together. Plastic materials have been used in lieu of metal in these types of spring toys. The plastic material has a single color.

SUMMARY OF THE INVENTION

The invention relates to an apparatus for making a helical coil spring object. The apparatus has extruder means operable to heat plastic material and deliver heated plastic material to a die. The die has an outlet opening forming the cross sectional shape of an elongated ribbon product. A forming unit having a rotatable mandrel winds the ribbon product into a helical coil spring object. A separator plate and roller means guides the ribbon product in a helical direction as the ribbon product is wound on the mandrel. The ribbon product moves through a cooling liquid, as water, as it is wound on the mandrel whereby the product hardens or sets. The coiled ribbon product is cut at selected intervals to form the coil spring object.

The extruder means includes two extruders for moving heated plastic materials of different colors to the die. The die has a merging chamber wherein the colored plastic materials are fused or located side by side and forced through the outlet opening as a two-colored ribbon product. This product is wound on the mandrel to form a helical coil spring object having turns. Each turn has one color on one side and another color on the opposite side.

An object of the invention is to provide an apparatus for making a two-colored plastic coil spring object. Another object of the invention is to provide a method of joining two different colored plastic materials in an elongated ribbon having one color on one side of the ribbon and the other color on the opposite side of the ribbon. A further object of the invention is to provide an apparatus having a stepped mandrel for winding a plastic ribbon product into a helical coil spring object.

IN THE DRAWINGS

FIG. 1 is a diagrammatic plan view partly sectioned of the apparatus for making a plastic coil spring object;

FIG. 2 is an enlarged plan view of the die of apparatus of FIG. 1;

FIG. 3 is a front elevational view of FIG. 2;

FIG. 4 is an enlarged sectional view taken along the line 4—4 of FIG. 2;

FIG. 5 is an enlarged sectional view taken along the line 5—5 of FIG. 1;

FIG. 6 is a side elevational view of FIG. 5;

FIG. 7 is a sectional view taken along the line 7—7 of FIG. 1;

FIG. 8 is a side elevational view of FIG. 7;

FIG. 9 is a sectional view taken along line 9—9 of FIG. 7;

FIG. 11 is an enlarged transverse sectional view of a part of a complete two-colored plastic coil spring object.

PREFERRED EMBODIMENT OF THE INVENTION

Figure 10:
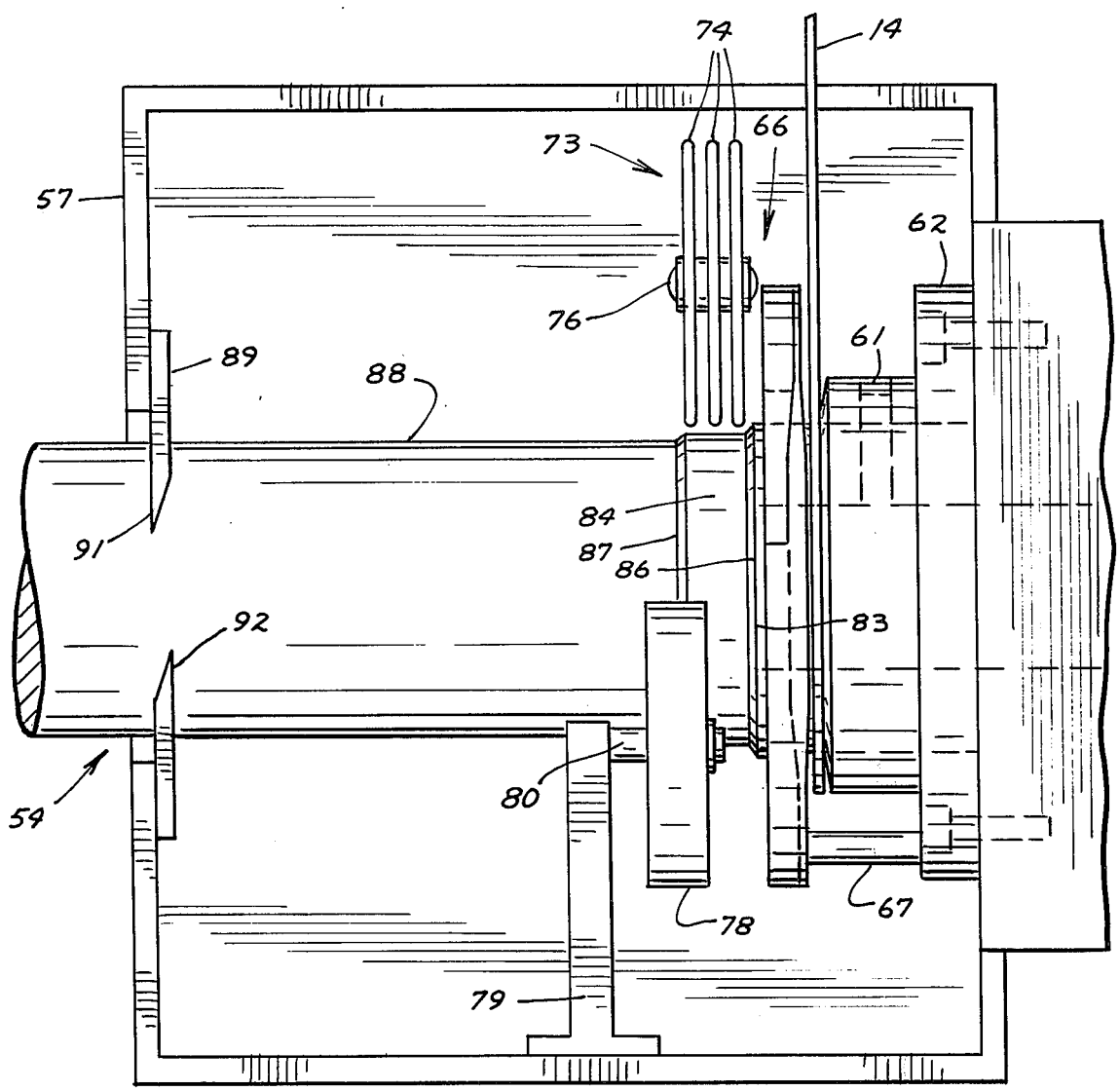
FIG. 10 is an enlarged plan view of a portion of the mandrel of FIG. 1 with part of the coiled ribbon product deleted.

Referring to FIG. 1, there is shown an apparatus indicated generally at 10 for making a helical plastic coil spring object or toy. Apparatus 10 has a first extruder 11 and a second extruder 12 operable to continuously supply fluid-like plastic materials to a common die indicated generally at 13 to form an enlarged continuous ribbon product 14. Extruder 11 operates to supply a plastic material of a first color, for example, red, to die 13. In a similar fashion, extruder 12 operates to continuously supply plastic of a second color, for example, yellow, to die 13. Die 13 fuses, joins or merges the two plastic materials in side-by-side portions with a minimum of mixing of the materials to form a continuous ribbon product 14. Product 14 is a moving band of plastic material having a first side of plastic material of the first color and a second side of plastic material of the second color.

The product 14 is directed to a spring forming unit indicated generally at 16. The product 14 is wound around a mandrel 54 and formed into a coil spring or helical configuration. The end product is a continuous helical coil spring object 17.

Spring object 17 is an enlongated band or ribbon wound about a central axis substantially in a helical shape. The band has inner and outer longitudinally extended edge surfaces and generally radially extended side surfaces. The complete object 17 has a plurality of turns substantially equal in size located in a side-by-side arrangement to form a collapsed coil spring. Spring object 17 is constructed of plastic material such as high density polyethylene, polystyrene and the like. A detailed description of the plastic spring object 17 is disclosed in applicant's co-pending U.S. application Ser. No. 733,199 filed Oct. 18, 1976. The disclosure of this application is incorporated herein by reference.

Extruder 11 has an elongated tubular body 18 having a cylindrical longitudinal passage 19. A hopper 21 open to the inlet end of passage 19 permits a supply of granular plastic material to move into the passage 19. An elongated helical screw 22 located in passage 19 operates to move or force plastic material from inlet hopper 21 to an outlet neck 23 connected to die 13. Screw 22 is joined to a drive shaft 24. A thrust bearing 26 surrounds drive shaft 24 and operates to maintain the screw in passage 19. Drive shaft 24 is rotated with a motor 27 such as an electric motor. Motor 27 is connected to a gear box or variable speed reducing unit 28. A power transmission 29, such as a chain or belt, connects gear box 28 to drive shaft 24. Gear box 28 functions to adjust the speed of rotation of the screw 22 and thereby regulate the amount of plastic material that is moved into die 13. Heating elements 31 surround body 18. The heating elements 31 may be an electrical cylindrical heating jacket that functions to heat body 18 and the plastic material moving through passage 19. Cooling elements 32, such as tubular members for directing air on the outer surfaces of the heating elements, provide for a rapid control of the temperature of the plastic material moving through passage 19.

Extruder 12 is identical to extruder 11. Parts of extruder 12 that correspond to parts of extruder 11 have the same reference numerals with the suffix A.

Referring to FIGS. 2, 3 and 4, die 13 comprises a housing or casing 33 made from a generally square block of metal. Housing 33 has a first passage 34 in communication with a passage 36 in the extruder neck 23. The opposite side of housing 33 has a second passage 37 in communication with the passage 38 and the extruder neck 23A. Passages 34 and 37 converge toward each other and are connected to short longitudinal bores 39 and 41 respectively. Bores 39 and 41 are located in longitudinal side-by-side positions and have about the same size and length. Each bore 39 and 41 is open to the large end of a generally cone-shaped merging chamber 42. Chamber 42 is located in a head 43 mounted on housing 33. As shown in FIG. 3, a plurality of bolts 45 secure head 33 to the outlet face of the housing 33. Head 43 has a generally vertically elongated slit outlet opening or discharge opening 44 in communication with the small end or the base of chamber 42. The inside part of head 43 has a circular boss 46 that fits into a complimentary recess 47 in housing 33. Boss 46 longitudinally aligns chamber 42 with bores 39 and 41.

Referring to FIG. 4, discharge opening 44 is an elongated vertical slit in head 43. The slit is formed by generally downwardly converging sides 48 and 49. The top of the slit has a convex top wall 51. The bottom of the slit has a convex bottom wall 52. Each corner of the slit has an outwardly directed ear or corner section 53. The shape of the discharge opening 44 provides for a greater amount of plastic material at the corners to compensate for the shrinkage of the plastic material during the cooling and stretching of the plastic material from a fluid-like state to a solid state.

Returning to FIG. 1, forming unit 16 has an elongated cylindrical mandrel 54 connected to a variable speed gear motor 56. Motor 56 operates to rotate mandrel 54 about a generaly horizontal axis. Mandrel 54 is located in a tank 57 containing a cooling liquid, such as water 58.

Referring to FIGS. 5 and 6, a head indicated generally at 59 surrounds mandrel 54 and is secured to a support 60. Head 59 has a cylindrical collar 61 and an outwardly directed annular flange 62. A plurality of bolts 63 secure the flange 62 to support 60. Collar 61 has an outer end of face 64 leading to the outer surface of mandrel 54. Face 64 is inclined in a radial outward direction toward flange 62. In other words, face 64 is at a small angle, preferably 3° with respect to the transverse plane of mandrel 54.

As shown in FIGS. 7 and 8, a band or ribbon product separator indicated generally at 66 is located adjacent surface 64 of head 59. Separator 66 is a plate having a central opening for accommodating mandrel 54. A plurality of connectors, such as bolts 67, secure separator 66 to support 60. Separator 66 has a radially outwardly directed slot 68 open to the outer surface of mandrel 54. Slot 68 is formed by a forward edge 69 facing a back edge 71. Edge 69 inclines inwardly toward the edge 71 and is separated from the edge 71 to form a passage 72 for ribbon product 14 shown in FIG. 9. Returning to FIG. 8, the side wall of separator 66 facing the surface 64 is inclined inwardly toward surface 64.

Figure 12:
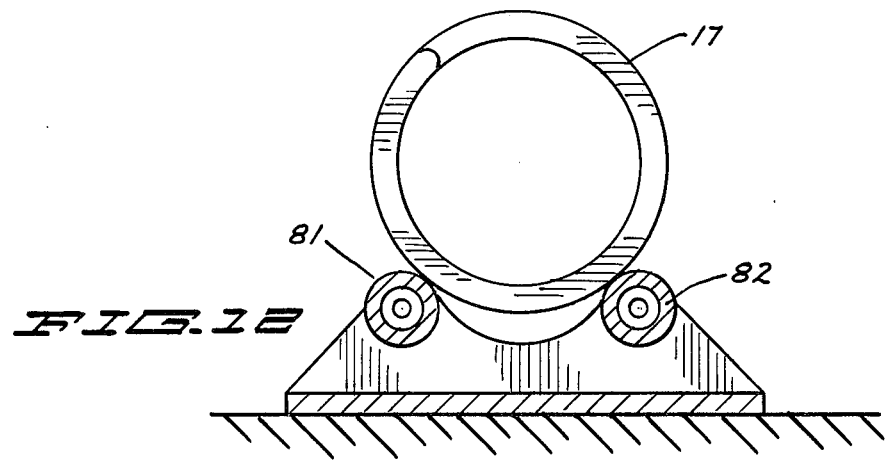
FIG. 12 is an enlarged sectional view taken along lines 12—12 of FIG. 1.

As shown in FIGS. 1 and 10, ribbon product 14 leaving the separator 66 is a helical or spiral ribbon. The space between adjacent turns of the spiral is maintained by a divider roller 73. Roller 73 has three annular ribs or discs 74 that have outer surfaces located near the outer surface of mandrel 54. Roller 73 may be provided with additional ribs 74 so that it has four or more ribs. A fixed axle 76 rotatably supports the divider roller 73 on tank 57. Other support structure can be used to hold axle 76. The turns of the spring object 17 are held in frictional engagement with the outside surface of mandrel 54 with a rubber roller 78. Roller 78 is rotatably mounted on an axle 80 carried by a support arm 79. The spring object follows mandrel 54 whereabout a number of revolutions, preferably 12 or 13 revolutions. It then passes over the end of tank 57 onto a pair of continuously rotating take-off rollers 81 and 82. As shown in FIG. 12, rollers 81 and 82 carry the helix spring object 17 to a conventional cutter 85 which cuts the spring object to uniform length to form the spring object 17.

Referring to FIG. 10, mandrel 54 has a first cylindrical surface portion 83 surrounded by separator 66. The surface of mandrel 54 has a second cylindrical surface portion 84 separated from portion 83 with an inclined step 86. Surface portion 84 is smaller in diameter than surface portion 83 to prevent the cooling product 14 from binding on mandrel 54. A second inclined step 87 separates surface portion 84 with a third cylindrical surface portion 88. Cylindrical surface portion 88 has a diameter smaller than the diameter of the coiled ribbon product surrounding mandrel 54 to prevent the product from binding on mandrel 54. Portion 88 serves to guide the coiled ribbon product as it moves through the cooling water in tank 57. A C-shaped plate 89 attached to the end wall of tank 57 has arcuately spaced ends 91 and 92 which allows the coiled ribbon product turning with mandrel 54 to move from tank 57 onto rollers 81 and 82.

The cross section of a turn of the object 17 is shown in FIG. 11. The turn has a first side wall 91 having an inwardly tapered inside portion 92. A second side wall 93 faces side wall 91 and has an inwardly tapered inside portion 94. Portions 92 and 94 terminate in an inner edge or surface 96. Side walls 91 and 93 are joined to an outer edge or surface 97. The entire turn is a single plastic material formed from a first colored plastic 98 and a second colored plastic 99. The plastic colored parts 98 and 99 are separated along a transverse color line 101.

The method of making the coil spring object 17 comprises the forming an elongated ribbon product 14 of hot plastic material in a semi-solid or fluid state. The ribbon product 14 is placed on the outer surface of mandrel 54 by winding it into a helical coil shape having a plurality of turns to form the coil spring object. The ribbon product 14 leaves the die 13 and follows a cylindrical or circular path between the heads 59 and separator 66. The separator 66 starts the ribbon product into a helical or longitudinal motion to continuously provide the helical shape to the coil spring. The ribbon product as it is wound on the mandrel 54 is cooled in the water 58 to change the plastic material from its semi-solid state to its solid or rigid state. The cooling of the plastic material also causes the plastic material to shrink whereby the coil spring object reduces its diameter. Mandrel 54 has three step surfaces 83, 84 and 88. These surfaces are cylindrical and have decreasingly smaller diameters to compensate for the shrinkage of the plastic material. The reduced diameter of the surfaces 84 and 88 prevent the coiled product from binding on the mandrel 54.

The coil spring object 17 is made of two colors of the same plastic material. The two-colored object 17 is made by heating and extruding a first plastic material with the extruder 11 and heating and extruding a second plastic material with the extruder 12. These materials have different colors such as red and yellow. Other colors can be used. The plastic materials are delivered to the die 13 and fed into the merging chamber 42. Equal amounts of plastic material are fed into the merging chamber 42 via the bores 39 and 41. The material is subjected to substantially the same pressure and merges in a side-by-side position. The merged plastic materials are fused together and moved through exit opening 44 to form a single ribbon product 14. Ribbon product 14 has a generally rectangular cross section with the colored plastic material dividing the product along a radial transverse plane. During the merging of the materials in the die 13 there is only a nominal amount of the flow of the colored materials into each other so that there is a clear color line 101 as shown in FIG. 11. The ribbon product 14 is not laminated in that the plastic material being the same material forms a homogeneous ribbon product 14 as it leaves the die 13.

While there has been shown and described a preferred apparatus and method of forming a helical coil spring object, it is understood that changes in the structures, method steps and materials used to make the coil spring object may be changed and modified by one skilled in the art without departing from the invention. The invention is defined in the following claims.

I claim:

1. An apparatus for making a coil spring object comprising: a die having a pair of inlet passages and an outlet opening, a pair of extruder means operatively associated with the die for heating and moving plastic material through the inlet passages and outlet opening of the die whereby the plastic material moves from the die in the form of an elongated continuous ribbon product, a cylindrical mandrel located adjacent the die, said mandrel having a first outer surface for carrying the ribbon product as it is moved from the die, means connected to said mandrel for rotating the mandrel, means operatively associated with said mandrel for cooling the ribbon product carried by the mandrel, a stationary head having an annular collar surrounding the mandrel at said first outer surface, a separator surrounding the mandrel adjacent the head wherein ribbon product is carried on the first outer surface of the mandrel between the separator and the annular collar of the stationary head as it is moved from the die, said separator having spaced edges defining a radially outwardly directed slot providing a passage open to the mandrel for accommodating the ribbon product moved in a circular path by the rotating mandrel, said mandrel having a second outer surface on the side of the separator opposite the stationary head for receipt of ribbon product moved from the separator, said second outer surface having a diameter less than that of the first center surface to prevent binding on the mandrel by the ribbon product as it cools, a spacer wheel located adjacent the mandrel, said wheel having a plurality of spaced ribs engageable with the mandrel, adjacent ribs being spaced apart to accommodate a turn of the product, roller means operatively associated with said mandrel for holding the mandrel, means operatively associated with said mandrel to cut a turn of the product to form the coil spring object, and means downstream of said mandrel for supporting the coil spring object moving from the mandrel.

2. The apparatus of claim 1 wherein: the die has a chamber with an inlet end and an outlet end, first and second bores connecting the inlet end of the chamber with the first and second inlet passages, the outlet opening being connected to the outlet end of the chamber, said plastic material moving through the bores into the chamber, merging in said chamber, and moving from the chamber through the outlet opening to form the ribbon product.

3. The apparatus of claim 2 wherein: the outlet opening has a generally rectangular shape.

4. The apparatus of claim 2 wherein: the first and second bores are parallel to each other.

5. The apparatus of claim 2 wherein: the chamber has a cone shape with a large inlet end in communication with the first and second bores and a small outlet end in communication with the outlet passage.

6. The apparatus of claim 5 wherein: the first and second bores are parallel to each other and are located on opposite sides of the longitudinal center line of the chamber.

7. The apparatus of claim 5 wherein: the die has a head, said head having the cone-shaped chamber and the outlet passage.

8. The apparatus of claim 5 wherein: the outlet opening has a generally rectangular shape.

9. The apparatus of claim 1 wherein: the annular collar of the head has an annular end face axially spaced from the separator, said end face tapering radially outwardly away from the separator to guide the ribbon product in the space between the head and separator.

10. The apparatus of claim 1 wherein: the spacer wheel has three annular ribs defining two spaces for the ribbon product.

11. The apparatus of claim 1 wherein: the means for cooling the ribbon product carried by the mandrel is a tank for storing water, said mandrel being located relative to said tank whereby the ribbon product carried by the mandrel engages water stored in the tank.

12. The apparatus of claim 1 wherein: the mandrel has a third cylindrical portion smaller in diameter than the second cylindrical portion located adjacent the second cylindrical portion.

13. The apparatus of claim 1 wherein: the extruder means has a first extruder to deliver a first plastic material having a first color to the first passage of the die and a second extruder to deliver a second plastic material having a second color to the second passage of the die.

14. An apparatus for making a coil spring object comprising: a die having an inlet passage and an outlet opening, means operatively associated with the die for moving heated plastic material through the inlet passage and outlet opening of the die whereby the plastic material moves from the die in the form of an elongated continuous ribbon product, a mandrel located adjacent the die, said mandrel having a first outer cylindrical surface for winding the ribbon product into a helical coil shape as it is moved from the die, means operably associated with the mandrel for directing the ribbon product to the helical coil shape as the ribbon product is wound around the first outer cylindrical surface, said means including a stationary head surrounding said first outer cylindrical surface of the mandrel and having an annular collar, a separator surrounding the mandrel adjacent the head, wherein the ribbon product is moved from the die to said first outer cylindrical surface between the annular collar and the separator, said separator having spaced edges defining a radially, outwardly directed slot providing a passage open to the mandrel for accommodating the ribbon product moved in a circular path by the rotating material, means operatively associated with said mandrel for rotating the mandrel, means operably associated with the mandrel for cooling the ribbon product as the ribbon product is wound into the helical coil shape, and means operatively associated with said mandrel to cut a turn of the helical coil shape ribbon product to form the coil spring object.

15. The apparatus of claim 14 wherein: the die has a first inlet passage and a second inlet passage in communication with the outlet opening, said means for moving heated plastic material having first means for moving plastic material to the first passage and second means for moving plastic material to the second passage.

16. The apparatus of claim 15 wherein: the die has a chamber with an inlet end and an outlet end, first and second bores connecting the inlet end of the chamber with the first and second inlet passages, the outlet opening being connected to the outlet end of the chamber, said plastic material moving through the bores into the chamber, merging in said chamber, and moving from the chamber through the outlet opening to form the ribbon product.

17. The apparatus of claim 16 wherein: the first and second bores are parallel to each other.

18. The apparatus of claim 16 wherein: the chamber has a cone shape with a large inlet end in communication with the first and second bores and a small outlet end in communication with the outlet passage.

19. The apparatus of claim 18 wherein: the first and second bores are parallel to each other and are located on opposite sides of the longitudinal center line of the chamber.

20. The apparatus of claim 18 wherein: the die has a head, said head having the cone-shaped chamber and the outlet passage.

21. The apparatus of claim 18 wherein: the outlet opening has a generally rectangular shape.

22. The apparatus of claim 14 wherein: the means for cooling the ribbon product includes a tank for storing a cooling liquid, said mandrel being located in the tank whereby the ribbon product carried by the mandrel engages the liquid stored in the tank.

23. The apparatus of claim 14 wherein: the outer cylindrical surface of the mandrel has a first cylindrical portion and a second cylindrical portion smaller in diameter than the first cylindrical portion to accommodate for shrinkage of the plastic material being cooled.

24. The apparatus of claim 23 wherein: the outer cylindrical surface of the mandrel has a third cylindrical portion smaller in diameter than the second cylindrical portion located adjacent the second cylindrical portion.

25. The apparatus of claim 14 wherein: the die has a first inlet passage and a second inlet passage in communication with the outlet opening, said means for moving heated plastic material having a first extruder for moving a first plastic material having a first color to the first passage, and a second extruder for moving a second plastic material having a second color to the second passage whereby the ribbon product has two colored portions.

26. An apparatus for making a coil spring object comprising: a die having a pair of inlet passages and a generally rectangularly shaped outlet opening, said die having a conical shaped chamber with a large inlet end and a smaller outlet end, first and second parallel bores connecting the inlet end of the chamber with the first and second inlet passages, the outlet opening being connected to the outlet end of the chamber, said apparatus also including a pair of extruder means operatively associated with said die for heating and moving plastic material through the inlet passages and outlet opening of the die whereby the plastic material moves through the first and second bores into the chamber, merging in said chamber, and moving from the chamber through the outlet opening from the die in the form of an elongated continuous ribbon product, a cylindrical mandrel downstream of said mandrel having an outer surface for carrying the ribbon product, means connected to the mandrel for rotating the mandrel, means operatively associated with said mandrel for cooling the ribbon product carried by the mandrel, a stationary head surrounding the mandrel, a separator surrounding the mandrel adjacent the head, said separator having spaced edges providing a passage open to the mandrel for accommodating the ribbon product moved in a circular path by the rotating mandrel, a spacer wheel having a plurality of spaced ribs engageable with the mandrel, adjacent ribs being spaced apart to accommodate a turn of the product, roller means operatively associated with said mandrel for holding the mandrel, means operatively associated with said mandrel to cut a turn of the product to form the coil spring object, and means downstream of said mandrel for supporting the coil spring object moving from the mandrel.

27. The apparatus of claim 26 wherein: said mandrel has a first outer cylindrical surface for carrying ribbon product as it is moved from the die and a second outer cylindrical surface having a smaller diameter than the diameter of the first surface for receiving product from the first surface.

* * * * *

UNITED STATES PATENT AND TRADEMARK OFFICE
CERTIFICATE OF CORRECTION

PATENT NO. : 4,074,958
DATED : February 21, 1978
INVENTOR(S) : Lester V. Molenaar It is certified that error appears in the above-identified patent and that said Letters Patent are hereby corrected as shown below:

Column 3, line 65, after "wall" insert -- 70 --.

Column 7, line 5, "material" should be -- mandrel --.

Signed and Sealed this

Fourth Day of July 1978

[SEAL]

Attest:

RUTH C. MASON
*Attesting Officer*

DONALD W. BANNER
*Commissioner of Patents and Trademarks*